United States Patent
Brown et al.

[11] 3,880,556
[45] Apr. 29, 1975

[54] CORRECTIVE HEATING OF PNEUMATIC TIRES

[75] Inventors: Edward S. Brown; Rudy D. Henson; James D. Farris, all of Mayfield, Ky.; John A. Feola, Akron, Ohio

[73] Assignee: The General Tire and Rubber Company, Akron, Ohio

[22] Filed: Nov. 14, 1973

[21] Appl. No.: 415,923

Related U.S. Application Data
[62] Division of Ser. No. 274,356, July 24, 1972.

[52] U.S. Cl. .................. 425/11; 425/41; 264/36; 425/445
[51] Int. Cl. ............................................ B29h 5/02
[58] Field of Search ............ 425/11, 12, 15, 17, 21, 425/26, 27, 28, 29, 30, 40, 34, 41, 42, 58

[56] References Cited
UNITED STATES PATENTS

| | | |
|---|---|---|
| 2,407,806 | 9/1946 | Arnold et al. ........................ 425/21 |
| 2,814,073 | 11/1957 | VanScogk ............................ 425/27 |
| 2,871,514 | 2/1959 | White .............................. 425/42 X |
| 3,052,921 | 9/1962 | Robinson ......................... 425/26 X |
| 3,484,903 | 12/1969 | Rawls .................................. 425/29 |
| 3,701,615 | 10/1972 | Johnson ........................... 425/30 X |
| R21,956 | 11/1941 | Hawkinson ........................ 425/21 |

Primary Examiner—J. Howard Flint, Jr.

[57] ABSTRACT

Adverse effects on pneumatic tire performance caused by an excessive variation in radial force are reduced by localized heat treatment of the cured pneumatic tire. The area where an excessive variation will occur is determined and the tire is suspended on a special heating apparatus of the present invention with its axis of rotation disposed horizontally such that said area is located vertically above the axis. Heat can then be applied to a portion of the inner surface of the tire adjacent said area for a predetermined time and/or until a predetermined maximum inner surface temperature is reached. This treatment results in a reduction in the magnitude of the force variation.

4 Claims, 3 Drawing Figures

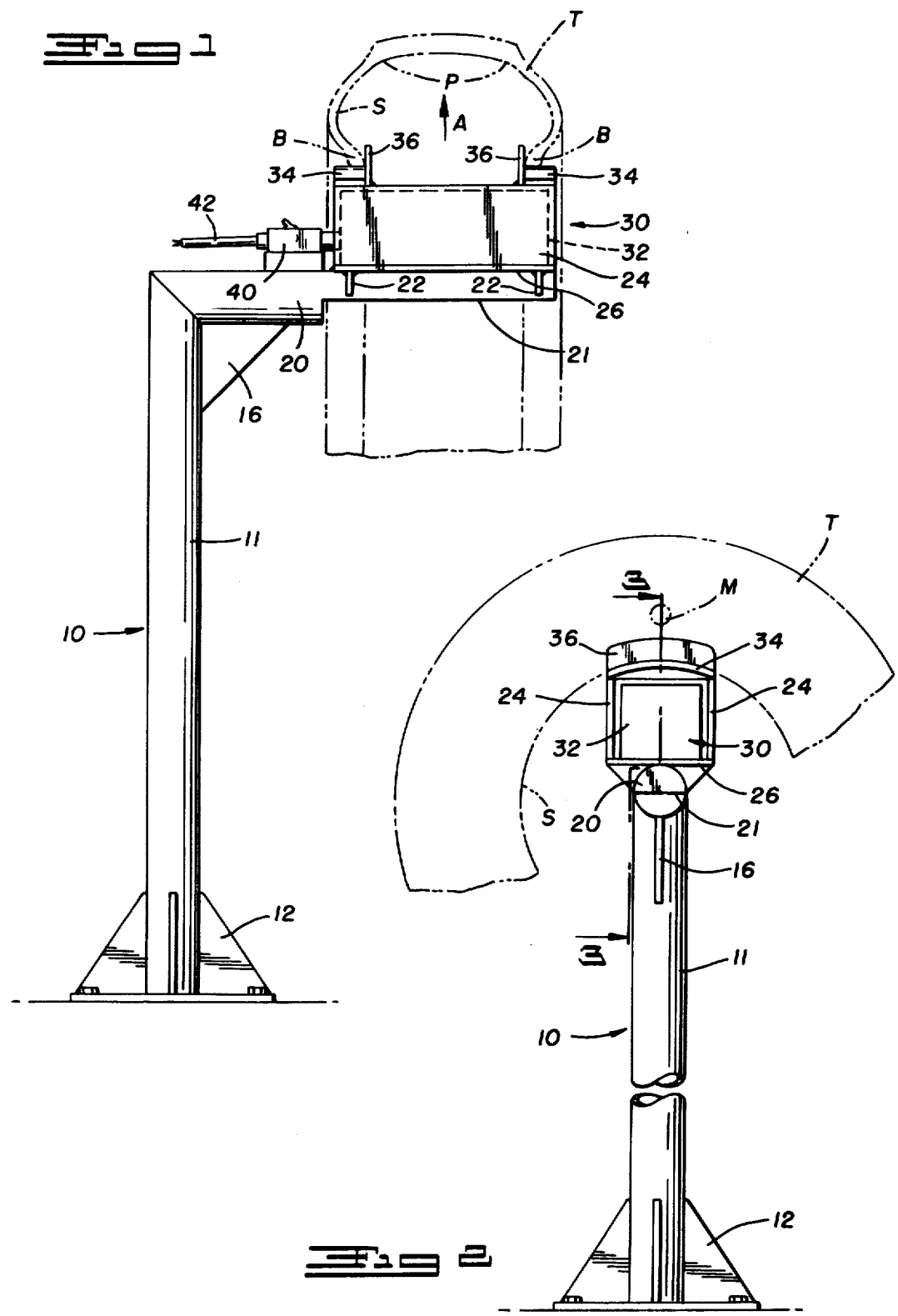

CORRECTIVE HEATING OF PNEUMATIC TIRES

This is a division of application Ser. No. 274,356, filed July 24, 1972.

BACKGROUND OF THE INVENTION

This invention relates to apparatus for improving pneumatic tires and particularly for improving the riding characteristics of pneumatic tires.

A pneumatic tire rotating under load against a surface, such as a roadway, generates variable forces against that surface throughout one revolution. This phenomenon is caused by a great number of factors which the tire industry usually collectively calls tire "non-uniformities". These variable forces can each be described as a composite of a radial lateral and tangential force component each of which force components are also variable throughout one revolution.

It is a widely accepted view that the variable radial force component (hereinafter "radial force variation") has a significant effect upon the riding characteristics of pneumatic tires. Studies have been made which conclude that tires which generate radial force variations which exceed certain magnitudes have undesirable riding characteristics.

In recent years many attempts have been made to solve this problem the most successful of which has been the development of methods and apparatus directed toward "force correction" of these tires.

Force correction basically includes correlating an area or areas of the tire with the potential generation of a force variation or variations (usually radial) of excessive magnitude and doing something to that tire which reduces the magnitude to an acceptable value.

Specific corrective apparatus of this type vary and notably include those based upon the removal of small amounts of material from the tire, the addition of small amounts of material to the tire, or the controlled reheating of tires.

Force correction based upon the removal of material from the tire (hereinafter "corrective grinding") is disclosed in U.S. Ser. No. 613,252 filed Feb. 1, 1967 now abandoned in favor of a continuation application U.S. Ser. No. 73,602 filed Sept. 18, 1970 and a divisional U.S. Ser. No. 18,773 filed Feb. 27, 1970 and issued Apr. 3, 1973 as U.S. Pat. No. 3,724,137, all of which are assigned to the present assignee.

Force correction based upon the adding of material to the tire (hereinafter "corrective addition") is disclosed and claimed in U.S. Ser. No. 57,384 filed July 21, 1970, which issued Apr. 3, 1973 as U.S. Pat. No. 3,725,163, which is a continuation-in-part of the aforementioned U.S. Ser. No. 613,252 and which is also assigned to the present assignee.

Force correction based upon the controlled reheating (hereinafter "corrective heating") is disclosed in U.S. Ser. No. 874,686 filed Nov. 6, 1969, abandoned in favor of continuation-in-part U.S. Ser. No. 61,819 filed Aug. 6, 1970 which issued as U.S. Pat. No. 3,632,701, also assigned to the present assignee. Corrective heating includes analyzing the tire to locate the area which correlates with the potential generation of an unacceptable radial force variation and suspending the tire such that its axis of rotation is disposed horizontally and the location of said area is vertically above the axis of rotation and heating the tire, while suspended in this manner, for a predetermined period of time to effect a reduction of the magnitude of the radial force variation.

Excessive force variations in some cases, should be reduced by corrective grinding only when the magnitudes are not overly excessive. In other words, there is a practical upper limitation on the magnitudes of excessive force variations which permit corrective grinding. Tires having radial force variation magnitudes which exceed this limitation should not be corrected by present corrective grinding techniques. Accordingly, however, corrective heating may be used prior to corrective grinding to reduce an overly excessive force variation to the level where further reduction by corrective grinding is then permissible.

Thus corrective heating may be used singularly to reduce excessive force variations to an acceptable level or in conjunction with corrective grinding to reduce overly excessive force variations to a level permissible for corrective grinding.

Presently, corrective heating processes such as those disclosed in U.S. Pat. No. 3,632,701 have several problems associated therewith. The processes involve unusually long periods of time (usually more than ten minutes per tire). Also, the equipment used in certain of the processes can be cumbersome, inefficient and often impractical from the standpoint of commercial production.

The present invention is concerned with an improved, simple and efficient apparatus to perform an improved corrective heating process.

SUMMARY OF THE INVENTION

It is an object of the present invention to provide an improved, relatively simple and efficient apparatus for heating a tire to reduce undesirable force variation generated by a tire when rotated and under lower load against a surface.

This and other objects, which will become evident hereinafter, are achieved by the apparatus according to the present invention wherein a tire to be corrected is suspended in an upright position such that its axis of rotation is substantially horizontal and a previously located area of "high" radial force variation is disposed substantially vertically above said axis and while the tire is so disposed heat is directed or focused upon a portion of the inner surface of the tire adjacent said area for a prescribed period of time and/or until said portion of the inner surface reaches a prescribed maximum temperature.

BRIEF DESCRIPTION OF THE DRAWINGS

In the drawings:

FIG. 1 is a side elevation of a preferred embodiment of the apparatus according to the present invention;

FIG. 2 is a frontal view of the apparatus shown in FIG. 1 with certain portions broken away and/or omitted;

DETAILED DESCRIPTION AND A PRESENTLY PREFERRED EMBODIMENT OF THE INVENTION

Figure 3:
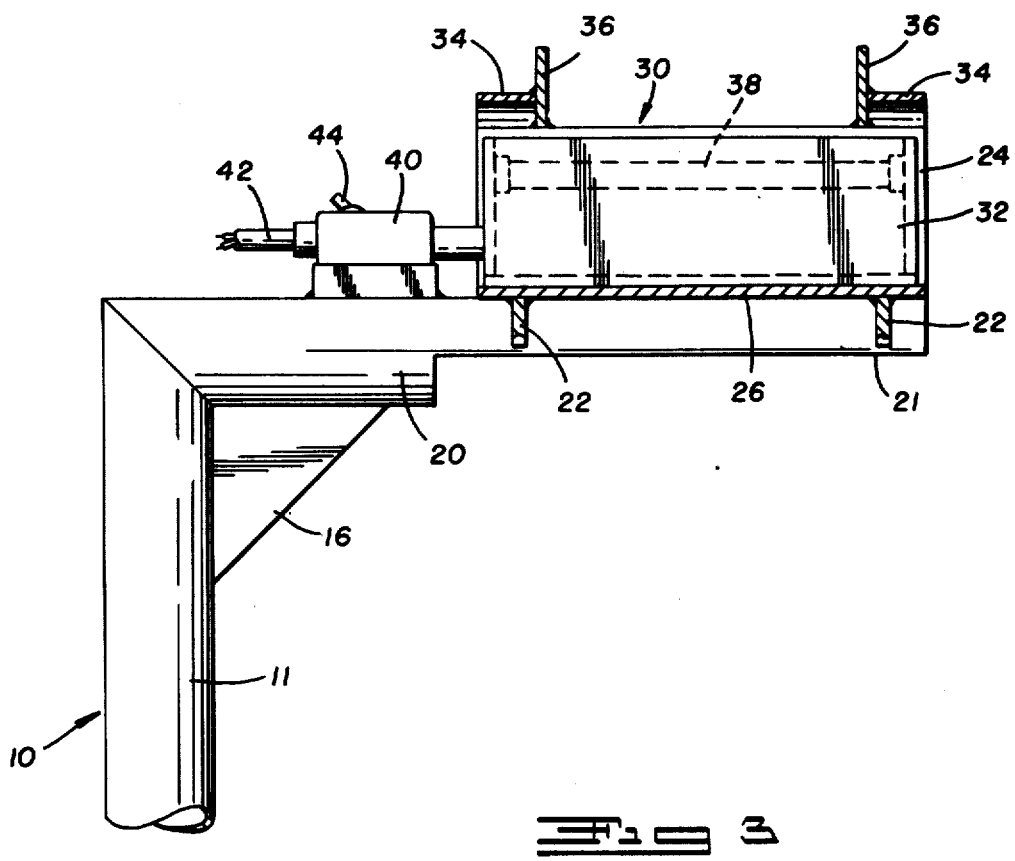
FIG. 3 is an enlarged sectional view taken along lines 3—3 of FIG. 2.

Referring to FIGS. 1 through 3 the apparatus of the present invention according to a presently preferred embodiment includes a vertically disposed support member 10 including a support post 11 and a base 12 bolted or otherwise secured to the floor, foundation or the like. The support post 11 may be cylindrical as shown or any other desired configuration found suitable. The support post material should be of adequate strength such as steel. Furthermore, it is evident that for reasons of convenience or space requirements vertical supports other than that shown may be used such as, for example, a vertical wall. Also, if desired, the apparatus may be made portable by suitable attachment of vertical support 10 to a movable platform.

Welded or otherwise secured to the upper end vertical support post 10 is a horizontal support member or arm 20 extending in cantilever fashion therefrom. When required, support of arm 20 by post 11 may be bolstered by a triangular brace or gusset 16 as shown. Horizontal support member 20 may be a cylindrical steel member or any other desired configuration and/or suitable material. Also, if necessary, a part of the lower portion of arm 20 such as indicated at 26, may be removed to reduce the weight to be supported.

A heating means 30 is mounted on horizontal member 20 by a spaced pair of suitable mounting plates 22. The heating means 30 preferably includes an infra-red heating device 32 disposed within an open ended case composed of two parallel side plates 24 and a flat bottom plate 26 welded or otherwise secured to mounting plates 22. An arcuate seat 34 is welded or otherwise secured to each pair of opposite upper ends of the parallel side plates 24. Welded or otherwise secured to each arcuate seat 34 and to the upper edges of side plates 24 is an upwardly extending flange 36. The infra-red heating device 32 is a commercially available device and usually includes one or more quartz infra-red lamps such as 38 (FIG. 3) and typical or conventional deflectors (not shown).

Welded or otherwise secured to the horizontal arm 20 is a conventional timer switch 40 which permits or prevents the passage of electrical current from a suitable source (not shown) to the heating device 32 through appropriate wiring 42. An on-off switch 44 opens or closes the circuit to heating device 32 and when the circuit is closed a timer may be set which automatically opens the circuit after a pre-set lapse of time.

As described in the aforementioned U.S. Pat. No. 3,632,701, corrective heating finds particular advantages when utilized on tires which have been "post-inflated." Briefly, post-inflation is a process whereby tires upon removal from the curing press are inflated to a prescribed pressure on a rim and allowed to cool to a preselected temperature. This post-inflation reduces any tendency which the tire reinforcement cords have to shrink upon cooling and re-elongate during use. This tendency is more prevalent in tires utilizing nylon and/or polyester type cords.

Post-inflation, however, has been found to have an adverse effect upon the "uniformity" of the tire as determined by the magnitudes of radial force variations generated when the tire rotates under load against a surface.

These radial force variations are typically determined by means such as those described in U.S. Pat. No. 3,632,701 and those tires found to have an excessive or unacceptable force variation or variation are either corrected by techniques previously described or are reclassified.

Although ranges of uniformity classifications of force measured tires may vary, a typical example of a passenger tire which would not need corrected, or in other words would be considered "uniform," would be one which is determined to have no radial force variation in excess of 25 pounds. Passenger tires generating one or more force variations of a magnitude of between about 26 to 45 pounds might, then, for example, be considered within the "permissible to grind" limits previously mentioned. Further, passenger tires generating a radial force variation in excess of 45 pounds would, then, in some cases not be considered for corrective grinding.

The specific force values mentioned above are based upon what is often referred to as the radial "composite" or "peak to peak" force variation. A curve (sometimes called a uniformity curve) plotting radial force magnitude vs circumferential tread locations for one revolution of the tire is composed of summation of harmonic curves. Therefore, a radial force variation can be considered as a composite of many harmonic force values. It is widely accepted that the first harmonic curve is the principal contributing factor to the radial composite force curve. Under this view, tires are now sometimes analyzed by determining the location of the "peak" of the first harmonic curve and corrected if that peak exceeds a predetermined limit.

In accordance with the preceding, tires may be appropriately marked to locate an excessive radial composite force variation or excessive radial harmonic force, or both. After a tire has been marked as "non-uniform" indicating an excessive radial first harmonic or composite force or both, it is then desirable to correct this tire. The tire may be corrected by corrective heating or corrective grinding or both as disclosed in U.S. Pat. No. 3,632,701.

In corrective heating, the tire is suspended in an upright position such that its axis of rotation is substantially horizontal and the mark or location indicative of an excessive radial force variation (either harmonic or composite) is substantially vertically above said axis. While in this position the tire is heated and a reduction in the excessive force variation results to the extent that corrective grinding is not necessary or is thereafter permitted if the tire had originally been outside the "permissible to grind" limits.

As aforementioned, prior corrective heating techniques have thus far required impractical periods of time. Also, in some cases, inflation of certain tires on rims is necessary to achieve desired results. Further, prior corrective heating processes require cumbersome equipment such as ovens, pot heaters and/or autoclaves.

In accordance with this invention it has been discovered that by altering the manner whereby heat is applied to the tire during corrective heating processes, the disadvantages mentioned become non-existant. Specifically, by directing heat only toward that portion of the tire inner surface adjacent the location indicative of an undesirable radial force variation, the corrective heating time may be significantly reduced, inflation of certain tires becomes unnecessary, and the equipment used is greatly simplified.

The present invention may be more readily understood by describing the process in a preferred form utilizing the apparatus previously described in detail and shown in the accompanying drawings.

A tire T with a mark M (see FIG. 2) which indicates the circumferential location indicative of an excessive radial force variation (either composite or first harmonic) is placed upon horizontal support arm such that flanges 36 fit between the two annular bead portions B of tire T. The radius of curvature of arcuate seats 34 is generally the same as the radius of curvature of the bead portions B so as to lessen the chances of injury to the bead portions during placement of the tire. As can be seen, the tire T is mounted so that it is suspended above the floor or foundation and its axis of rotation is generally horizontal. Also, the tire is angularly disposed such that the mark M is substantially vertically above this axis of rotation. Heat is then applied vertically upwardly as indicated by the direction of arrow A directly to a portion P of the inner surface S of the tire T, which portion P is adjacent the location M indicative of the excessive force variation.

The inner surface of most tires include a thin layer of elastomeric material usually called an inner liner which covers the cord reinforced carcass. Tests have shown that the temperatures achieved at these inner liners during corrective heating may be used as controlling parameters associated with the corrective heating process of this invention. For example, for most passenger and light truck tires having polyester or nylon carcasses it is found that when the portion of the inner liner toward which heat is directed reaches a temperature between 225°F. to about 240°F., a reduction in radial force variation to a desirable level results. However, it has been found in some of these tires that further heating to inner liner temperatures substantially above 240°F. may adversely affect the tire dimensionally.

This limitation on inner liner temperature can of course vary with substantive differences in inner liners. The thickness and composition of the inner liner for example, can directly influence this temperature limitation.

Controlling the corrective heating process of this invention with regard to the inner liner temperature achieved is, however, somewhat impractical. This would require that appropriate temperature sensors, such as thermocouples, be connected to each tire heated. Fortunately, most pneumatic tires may be generally categorized according to types and/or size ranges. Tires within such categories are fairly standardized and thus somewhat similar. By determining the maximum inner liner temperature limitation of tires within a certain category and correctively heating a series of tires of such category, it is possible to associate an accurate criterion of maximum corrective heating time with the attainment of the maximum inner liner temperature limitation. Thus, depending upon the manner by which heat is applied, practical operating criteria may be established based upon heating time.

As stated previously, heat correction of typical polyester or nylon passenger or light truck tires is usually achieved at an inner liner temperature between about 225°F. and 240°F. Using 240°F. as an arbitrary upper temperature limit for the inner liner and using an infrared heating device of the type described herein such an inner liner temperature is normally achieved between about 2½ to 3 minutes. This time can, of course, vary with tires having substantial differences in section height. Thus tires with relatively small or low section heights may only require heat times slightly less than 2½ minutes, while tires with relatively large or high section heights might require heat times slightly beyond 3 minutes.

To exemplify the above-corrective heating times, Table I evaluates changes in radial force variation of a given size tire at selected time intervals up to about 8 minutes using an infra-red heating device as disclosed herein. The values of force variation change listed represent an average of five tires for each time interval except that for 8 minutes which included only two tires. The subjective "Comments" relates to any noticeable distortion of the tire.

TABLE I

| Time (minutes) | Radial Composite Force Variation (in lbs.) | Radial First Harmonic (in lbs.) | Comment |
|---|---|---|---|
| 1 | −3.6 | −4.8 | Acceptable |
| 2 | −6.6 | −5.8 | Acceptable |
| 3 | −8.0 | −8.4 | Questionable |
| 4 | −9.0 | −12.8 | Not acceptable |
| 4.5 | +10.4 | −5.0 | Not acceptable |
| 5 | +5.2 | −4.6 | Not acceptable |
| 6 | +27.2 | +15.6 | Not acceptable |
| 8 | +38.0 | +10.0 | Not acceptable |

From this data it was observed that at times beyond 4 minutes the radial composite force variation began to increase rather than decrease. Also, from the "Comments" it is seen that although at times beyond 3 minutes radial composite force variation did decrease, the dimensional regularity of the tires was adversely affected and hence were "Not acceptable."

After this experiment nine tires similar to those tested in Table I were heat corrected by the same device using heat times of 2½ minutes. The average reduction in radial composite force variation for these nine tires was 7.6 pounds, while the radial first harmonic average reduction was 8.4 pounds. All nine tires remained acceptable with regard to dimensional distortion.

These optimum heat times can also vary with alternative manners of heat application. As suggested previously, heating by an infra-red heat source is preferred, but not absolutely necessary. Accordingly, heat may be applied to the portion of the inner liner adjacent the undesirable force variation in other ways, if desired, such as by directing hot air or steam toward such portion.

Thus, by establishing proper corrective heating times, the process can be operationally controlled by suitable timers such as that shown associated with the apparatus described above.

As mentioned above, an important facet of the corrective heating process is its use to increase a manufacturers "Yield" of uniform tires by combining corrective heating with other correction techniques such as corrective grinding. Thus corrective heating can be used to reduce excessive force variations to a level where corrective grinding is permissable. Recalling that under typical uniformity classifications or standards discussed above, tires found to have an excessive radial composite force variation exceeding 45 pounds are sometimes not normally corrected by grinding, and tires having such variations of 25 pounds or less are considered uniform. Under Table II which follows, twelve typical polyester reinforced tires were selected, including passenger and light truck types, all of which had radial composite force variation outside the "permissible to grind" limits. Table II demonstrates correction of these tires utilizing a combination of corrective heating according to this invention and corrective grinding. The heat times on all tires were 2½ minutes.

TABLE II

| Tire No. | Initial Radial Force Variation (pounds) | After Corrective Heating (pounds) | After Corrective Grinding (pounds) |
| --- | --- | --- | --- |
| 1 | 54 | 45 | 22 |
| 2 | 52 | 39 | 23 |
| 3 | 49 | 42 | 21 |
| 4 | 52 | 43 | 22 |
| 5 | 58 | 44 | 22 |
| 6 | 50 | 43 | 21 |
| 7 | 52 | 43 | 22 |
| 8 | 50 | 36 | 24 |
| 9 | 47 | 44 | 22 |
| 10 | 50 | 45 | 24 |
| 11 | 52 | 37 | 25 |
| 12 | 47 | 33 | 23 |

Although the apparatus of the instant invention have been disclosed in presently preferred forms, it is understood that variations from what has been specifically described in the foregoing may be made which fall within the scope of the appended claims.

What is claimed is:

1. An apparatus for heat treating a cured pneumatic tire comprising:
   A. a vertically disposed support member having a base,
   B. a horizontally extending support member attached to said member a selected distance above said base, and
   C. a pneumatic tire heating means fixedly secured to said horizontally extended support member, said heating means including:
      1. a pair of spaced, upwardly extending flanges adapted to fit between the annular bead portions of a pneumatic tire, and
      2. a radiant heating device located between and vertically below said flanges, said heating device adapted to direct heat only in an upward direction.

2. The apparatus defined in claim 1 wherein said heating device is an infra-red heating device.

3. The apparatus as defined in claim 2 wherein said apparatus includes a timer switch whereby said heating device may be operated for prescribed periods of time.

4. The apparatus as defined in claim 1 wherein said apparatus includes a timer switch whereby said heating device may be operated for prescribed periods of time.

* * * * *